(12) United States Patent
Crosman, III et al.

(10) Patent No.: US 12,368,191 B2
(45) Date of Patent: Jul. 22, 2025

(54) SYSTEM AND METHOD FOR INITIALIZING OPERATIONS OF LITHIUM-ION BATTERY PACKS

(71) Applicant: Caterpillar Inc., Peoria, IL (US)

(72) Inventors: Alexander Cameron Crosman, III, Dunlap, IL (US); Garrett Tyler Nielson, Schererville, IN (US)

(73) Assignee: Caterpillar Inc., Peoria, IL (US)

( * ) Notice: Subject to any disclaimer, the term of this patent is extended or adjusted under 35 U.S.C. 154(b) by 731 days.

(21) Appl. No.: 17/457,079

(22) Filed: Dec. 1, 2021

(65) Prior Publication Data

US 2023/0170542 A1 Jun. 1, 2023

(51) Int. Cl.
*H01M 10/48* (2006.01)
*B61C 3/02* (2006.01)
*H01M 10/0525* (2010.01)

(52) U.S. Cl.
CPC ............... *H01M 10/48* (2013.01); *B61C 3/02* (2013.01); *H01M 10/0525* (2013.01); *H01M 2220/20* (2013.01)

(58) Field of Classification Search
CPC .... H02J 2310/48; H02J 7/0013; H02J 7/0032; H02J 7/0068; H01M 2220/20; H01M 10/48; H01M 10/0525
See application file for complete search history.

(56) References Cited

U.S. PATENT DOCUMENTS

| | | | |
|---|---|---|---|
| 4,731,601 A | 3/1988 | Nowakowski et al. | |
| 5,385,126 A | 1/1995 | Matthews | |
| 7,743,649 B1 | 6/2010 | Salman et al. | |
| 8,111,037 B2 | 2/2012 | Zhang et al. | |
| 2018/0219387 A1* | 8/2018 | Ishikawa | G01R 31/3648 |
| 2020/0370527 A1* | 11/2020 | Sturtevent | F02N 11/0803 |
| 2021/0199082 A1* | 7/2021 | Chen | F02N 11/0862 |

FOREIGN PATENT DOCUMENTS

| | | | | |
|---|---|---|---|---|
| IN | 4875/CHE/2012 | | 5/2016 | |
| WO | WO-2021167544 A1 | * | 8/2021 | ............ H02J 7/0013 |

OTHER PUBLICATIONS

WO-2021167544.*
Written Opinion and International Search Report for Int'l. Patent Appln. No. PCT/US2022/080299, mailed Apr. 5, 2023 (12 pgs).

* cited by examiner

*Primary Examiner* — Kiran Quraishi Akhtar
(74) *Attorney, Agent, or Firm* — Perkins Coie

(57) ABSTRACT

A system for initializing operations of one or more batteries of a lithium-ion battery pack to supply electric power to an electrical load includes a switching device, an output device, and a controller. The switching device is configured to move between a first position to facilitate supply of electric power from the batteries to the electrical load and a second position to restrict supply of electric power from the batteries to the electrical load. The output device is configured to be activated to indicate an availability of the batteries to supply electric power to the electrical load. The controller receives an input, actuates a contactor associated with at least one battery to facilitate electrical connection between the at least one battery and the electrical load, and moves the switching device to the first position to cause an activation of the output device in response to the actuation of the contactor.

6 Claims, 4 Drawing Sheets

SYSTEM AND METHOD FOR INITIALIZING OPERATIONS OF LITHIUM-ION BATTERY PACKS

TECHNICAL FIELD

The present disclosure relates to battery packs (e.g., lithium-ion battery packs). More particularly, the present disclosure relates to managing and/or initializing operations of one or more batteries of a lithium-ion battery pack to supply electric power to an electrical load (e.g., during a power start-up event of an engine) of a machine (e.g., a locomotive).

BACKGROUND

Machines, such as locomotives, include several electrical loads, with some of the electrical loads being larger than the other electrical loads. As an example of a relatively larger electrical load, machines often use starter systems to start a power source, such as an internal combustion engine of the machine. Such a starter system typically includes a starter motor that may draw relatively high electric power from an onboard electric power source to crank-up the internal combustion engine. Lead-acid battery packs are commonly used as an onboard electric power source. However, owing to rising demand for increased operational efficiency and downsizing, such onboard electric power sources may be replaced with relatively smaller and lighter battery packs, such as lithium-ion battery packs.

A lithium-ion battery pack typically includes lithium-ion batteries (or cells), power output terminals, and contactors that may be associated with the corresponding lithium-ion batteries. In an inactive state of the lithium-ion battery pack, the contactors may be maintained in an open position to isolate the lithium-ion batteries from the power output terminals so as to prevent power drain. In an active state of the lithium-ion battery pack, the contactors may be conversely moved to a closed position to connect the lithium-ion batteries to the power output terminals, and so that electric power may be supplied to the electrical loads. A delay is often encountered as the lithium-ion battery pack may move from the inactive state to the active state, with such delay being commensurately larger for the relatively larger electrical loads. If an operator of the machine attempts to start a larger electrical load, such as the starter motor, prior to the contactors (associated with a minimum number of lithium-ion batteries that are needed to start the larger electrical load) moving to the closed position, the lithium-ion battery pack may fail to supply the desired electric power to said larger electrical load. Moreover, over time, such improper use of the lithium-ion battery pack may also cause the lithium-ion battery pack to deteriorate, resulting in costly and laborious lithium-ion battery pack repairs and/or replacements.

Indian Patent No. 365232 discloses an electric start system for a vehicle with internal combustion engine in which the electric starting ability of the battery is monitored before cranking of the engine. Before cranking of the engine, the battery voltage is measured and compared with a predetermined voltage limit stored in a look up table by means of an electronic control unit. The electric start system is enabled or disabled based on the electric starting ability of the battery and same is indicated to the rider by an indicating means.

SUMMARY OF THE INVENTION

In one aspect, the disclosure relates to a system for initializing operations of one or more batteries of a lithium-ion battery pack to supply electric power to an electrical load of a machine. The system includes a switching device, an output device, and a controller. The switching device is configured to move between a first position and a second position. In the first position, the switching device facilitates supply of electric power from the one or more batteries to the electrical load, and in the second position, the switching device restricts supply of electric power from the one or more batteries to the electrical load. The output device is configured to be activated to indicate an availability of the one or more batteries to supply electric power to the electrical load. The controller is configured to receive an input. Further, the controller is configured to actuate, in response to the input, a contactor associated with at least one battery of the one or more batteries to facilitate electrical connection between the at least one battery and the electrical load based on one or more parameters associated with the at least one battery meeting corresponding parameter threshold conditions. Moreover, the controller is configured to move the switching device to the first position to cause an activation of the output device in response to the actuation of the contactor.

In another aspect, the disclosure is directed to a method for initializing operations of one or more batteries of a lithium-ion battery pack to supply electric power to an electrical load of a machine. The method includes receiving, by a controller, an input; actuating, by the controller in response to the input, a contactor associated with at least one battery of the one or more batteries to facilitate electrical connection between the at least one battery and the electrical load based on one or more parameters associated with the at least one battery meeting corresponding parameter threshold conditions; and moving, by the controller in response to the actuation of the contactor, a switching device to a first position to facilitate supply of electric power from the one or more batteries to the electrical load and cause an activation of an output device to indicate an availability of the one or more batteries to supply electric power to the electrical load.

In yet another aspect, the disclosure is related to a machine. The machine includes an electrical load, a lithium-ion battery pack including one or more batteries, and a system for initializing operations of the one or more batteries of the lithium-ion battery pack to supply electric power to the electrical load. The system includes a switching device, an output device, and a controller. The switching device is configured to move between a first position and a second position. In the first position, the switching device facilitates supply of electric power from the one or more batteries to the electrical load, and in the second position, the switching device restricts supply of electric power from the one or more batteries to the electrical load. The output device is configured to be activated to indicate an availability of the one or more batteries to supply electric power to the electrical load. The controller is configured to receive an input. Further, the controller is configured to actuate, in response to the input, a contactor associated with at least one battery of the one or more batteries to facilitate electrical connection between the at least one battery and the electrical load based on one or more parameters associated with the at least one battery meeting corresponding parameter threshold conditions. Moreover, the controller is configured to move the switching device to the first position to cause an activation of the output device in response to the actuation of the contactor.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
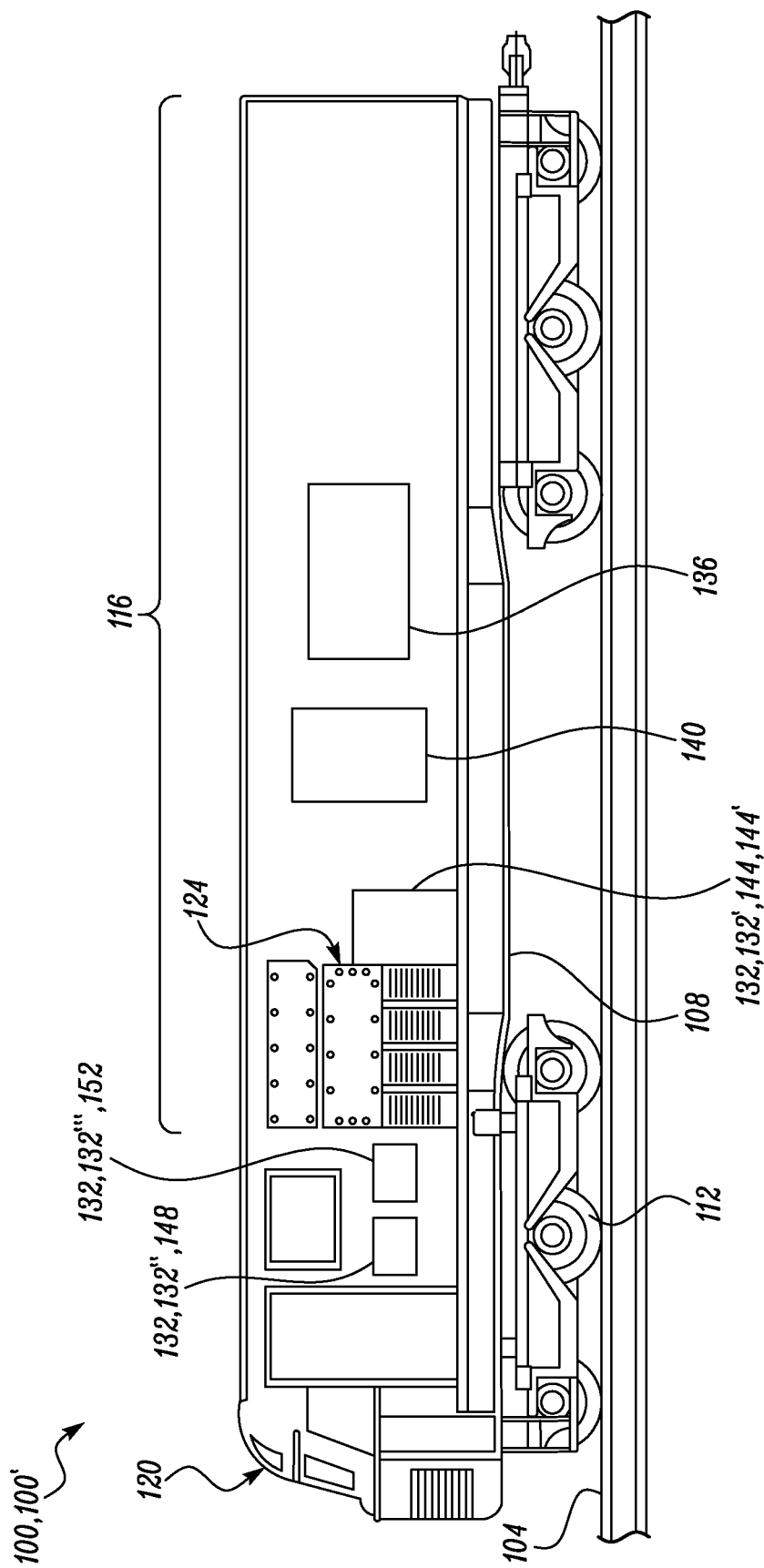
FIG. 1 is a side view of an exemplary machine including a lithium-ion battery pack, in accordance with an embodiment of the present disclosure.

Referring to FIG. 1, a machine 100 is shown. The machine 100 may include a locomotive 100'. The locomotive 100' may be configured to run on a track 104. The locomotive 100' may include a diesel-electric locomotive or a dual-fueled electric locomotive. The locomotive 100' may include single locomotive, multiple locomotives, a train moved by single locomotive, a train moved by multiple locomotives and any other arrangement of locomotives. The machine 100 may also embody or be representative of one or more of an off-highway truck, an on-highway truck, a dump truck, an articulated truck, a loader, and the like.

The machine 100 may include a chassis 108, a number of track wheels 112, a power compartment 116, and an operator cabin 120. The chassis 108 may support the operator cabin 120 and the power compartment 116, although other known components and structures may be supported by the chassis 108, as well. The track wheels 112 may support the chassis 108 on the track 104. The track wheels 112 may be configured to move and propel the machine 100 from one location to another.

The power compartment 116 may house an engine 124. The engine 124 may be configured to power operations of various systems and/or sub-systems on the machine 100, typically by combusting fuel. The engine 124 may include a diesel engine or may include any engine running on solid, liquid, or gaseous fuel.

The operator cabin 120 may be supported over the chassis 108. The operator cabin 120 may facilitate stationing of one or more operators therein, to monitor the operations of the machine 100. Also, the operator cabin 120 may house various components and controls of the machine 100, access to one or more of which may help the operators to control the machine's movement and/or operation. For instance, the operator cabin 120 may include an input device 128 (please see FIG. 2) that may be used and/or actuated to generate an input for starting the engine 124 of the machine 100.

The input device 128 may include a starter switch 128'. The starter switch 128' may be moved between multiple positions for establishing various working and non-working states of the engine 124. For example, the starter switch 128' may be moved to an "OFF" position, an "ON" position, and a "START" position. The "OFF" position of the starter switch 128' may correspond to a position at which the engine 124 may be restricted from running. The "ON" position may be the position of the starter switch 128' at which an engine running request may be initiated. The "START" position may be the position of the starter switch 128' that may be used to start and run the engine 124.

Further, the machine 100 may include one or more electrical loads 132, a lithium-ion battery pack 136, and a system 140. The one or more electrical loads 132 may include a first electrical load 132', a second electrical load 132", and a third electrical load 132'". The first electrical load 132' may exemplarily include an engine starter motor 144. The engine starter motor 144 may be mechanically coupled (e.g., via a drive gear) to a crankshaft (not shown) of the engine 124 to crank the engine 124 during an engine start-up event. In the present embodiment, the engine starter motor 144 may correspond to an electric starter motor 144' that may draw electric power from the lithium-ion battery pack 136 to operate, and in turn, rotate and crank the crankshaft to start the engine 124 during the engine start-up event.

The second electrical load 132" may be configured to draw less electric power relative to the electric power drawn by the first electrical load 132'. The second electrical load 132" may exemplarily include a Heating Ventilation Air Conditioning (HVAC) unit 148. The third electrical load 132'" may be configured to draw less electric power relative to the electric power drawn by the second electrical load 132". The third electrical load 132'" may exemplarily include a lighting unit 152.

The lithium-ion battery pack 136 may be electrically connected to the one or more electrical loads 132. The lithium-ion battery pack 136 may be configured to supply electric power to the electrical loads 132. For example, the lithium-ion battery pack 136 may supply an electric power to the engine starter motor 144 during the engine start-up event. Once the engine 124 is cranked and started, the lithium-ion battery pack 136 may be charged by an alternator (not shown) (driven by the engine 124) by methods known in the art.

Figure 2:
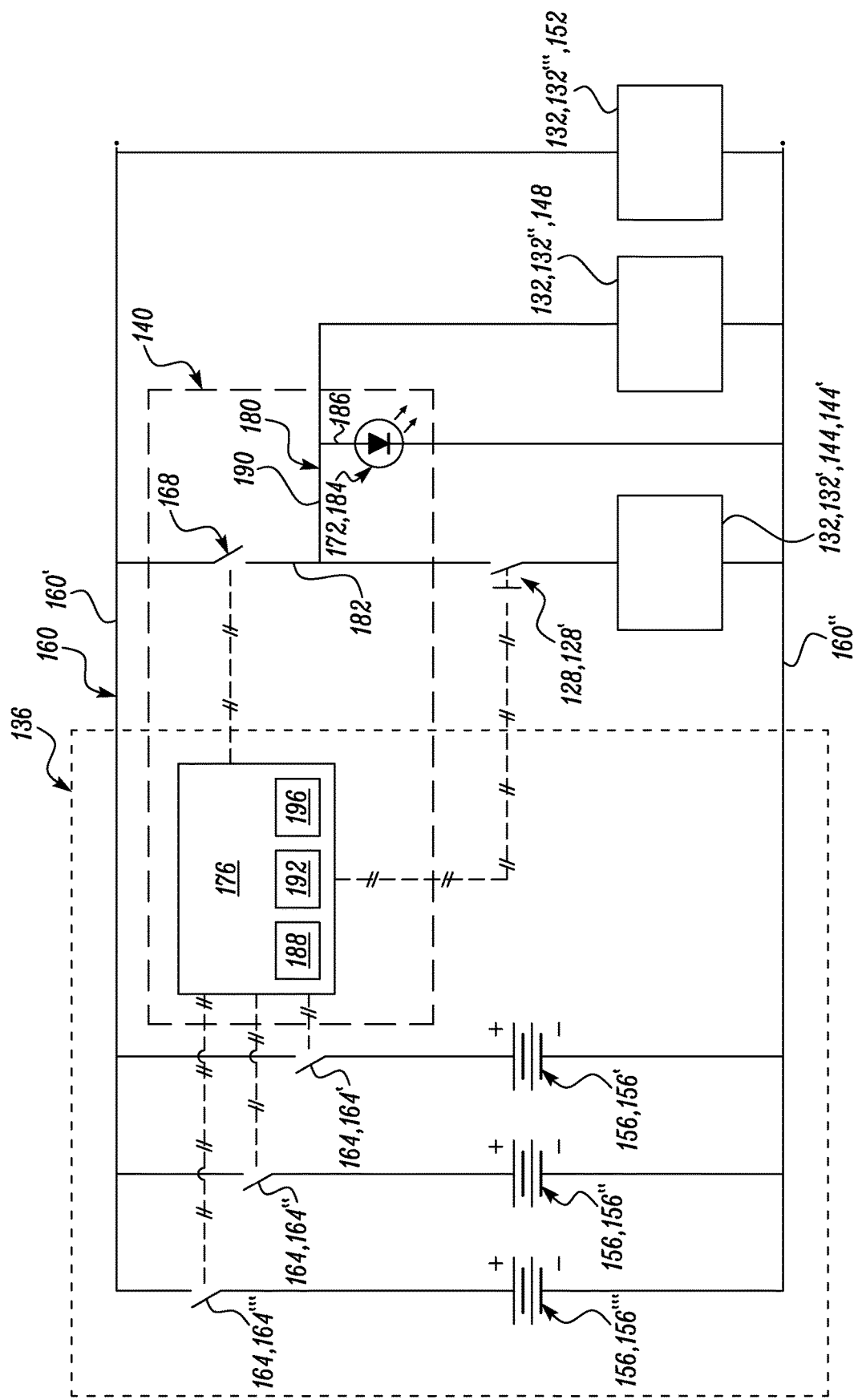
FIG. 2 is a schematic view of a system for initializing operations of the lithium-ion battery pack, in accordance with an embodiment of the present disclosure.

The lithium-ion battery pack 136 includes one or more batteries 156, a pair of power output terminals 160, and one or more contactors 164. As shown in FIG. 2, the lithium-ion battery pack 136 includes three batteries 156—a first battery 156', a second battery 156", and a third battery 156'". However, it may be contemplated that the lithium-ion battery pack 136 may have more or fewer number of batteries 156. The batteries 156 are configured to store electric power to be supplied to the electrical load 132. The pair of power output terminals 160 includes a first power output terminal 160' and a second power output terminal 160". The batteries 156 (i.e., the first battery 156', the second battery 156", and the third battery 156'") are parallelly disposed between the pair of power output terminals 160, i.e., between the first power output terminal 160' and the second power output terminal 160".

As shown in FIG. 2, the lithium-ion battery pack 136 includes three contactors 164—a first contactor 164', a second contactor 164", and a third contactor 164'". The first contactor 164' is disposed between the first battery 156' and the first power output terminal 160', and is configured to facilitate (or restrict) electrical connection between the first battery 156' and the electrical loads 132. Likewise, the second contactor 164" is disposed between the second battery 156" and the first power output terminal 160', and is configured to facilitate (or restrict) electrical connection between the second battery 156" and the electrical loads 132. Similarly, the third contactor 164'" is disposed between the third battery 156′″ and the first power output terminal 160′, and is configured to facilitate (or restrict) electrical connection between the third battery 156′″ and the electrical loads 132. In the present embodiment, a number of contactors 164 is the same as a number of batteries 156 in the lithium-ion battery pack 136, such that one contactor 164 is associated with one battery 156 of the one or more batteries 156. In other embodiments, the number of contactors 164 may be fewer that the number of batteries 156 in the lithium-ion battery pack 136, such that one contactor 164 may be associated with multiple batteries 156.

The first contactor 164′ is now discussed. The first contactor 164′ may include a mechanical push button, or a contact switch. Although not limited, the first contactor 164′ may be normally maintained in an open condition to isolate the corresponding first battery 156′ from the power output terminals 160 and prevent power drain from the first battery 156′. Upon actuation, the first contactor 164′ may move to a closed condition to allow supply of electric power therethrough. The first contactor 164′ may be configured to be actuated to electrically connect the corresponding first battery 156′ with the power output terminals 160. In that manner, the first contactor 164′ may facilitate electrical connection between the corresponding first battery 156′ and the electrical loads 132 (e.g., the engine starter motor 144).

In an example, the first contactor 164′ may be provided with an electromagnetic coil and a contact (not shown). Upon electrical actuation of the electromagnetic coil, the electromagnetic coil may generate a magnetic field and attract the contact towards the electromagnetic coil. As such the contact may facilitate the electrical connection between the corresponding first battery 156′ and the electrical loads 132. Likewise, on electrical de-actuation of the electromagnetic coil, the electromagnetic coil may fail to generate the magnetic field and hence fail to attract the contact towards the electromagnetic coil. As such the contact may restrict the electrical connection between the corresponding first battery 156′ and the electrical loads 132. The second contactor 164″ and the third contactor 164′″ are similar to the first contactor 164′ in construction and configuration, and hence will not be discussed.

The system 140 is now discussed. The system 140 is configured to initialize operations of the batteries 156 of the lithium-ion battery pack 136 to supply electric power to the electrical load 132 of the machine 100. The system 140 includes a switching device 168, an output device 172, and a controller 176. Also, the system 140 may include a circuit 180. Details related to each of the switching device 168, the output device 172, the controller 176, and the circuit 180 will be discussed in detail below.

The switching device 168 may be disposed between the lithium-ion battery pack 136 and the electrical load 132. In the present embodiment, the switching device 168 is disposed between the lithium-ion battery pack 136 and the engine starter motor 144. In an example, the switching device 168 may include an interlock relay, and may be configured to move between a first position and a second position. In the first position, the switching device 168 facilitates supply of electric power from the one or more batteries 156 (of the lithium-ion battery pack 136) to the electrical load 132. In the second position (as shown in FIG. 2), the switching device 168 restricts supply of electric power from the one or more batteries 156 to the electrical load 132.

In an example, the switching device 168 may be provided with an electromagnetic coil and a switch. Upon electrical actuation of the electromagnetic coil, the electromagnetic coil may generate a magnetic field and attract the switch towards the electromagnetic coil. In that manner, the switch may facilitate supply of electric power from the one or more batteries 156 to the electrical load 132. Likewise, on electrical de-actuation of the electromagnetic coil, the electromagnetic coil may fail to generate the magnetic field and hence fail to attract the switch towards the electromagnetic coil. In that manner, the switch may restrict supply of electric power from the one or more batteries 156 to the electrical load 132. There may be a variety of other switching devices known in the art that may facilitate or restrict supply of electric power from the batteries 156 to the electrical load 132.

The output device 172 may include one or more of a light emitting diode (LED), an audio output device, a tactile feedback device, a textual output device, and/or a display device. The output device 172 may be positioned within the operator cabin 120 of the machine 100. Further, the output device 172 may be disposed between the pair of power output terminals 160. Also, the output device 172 and the electrical load 132 may be electrically connected in parallel to each other. In the present embodiment, as shown in FIG. 2, the output device 172 may be a light emitting diode 184 which may be parallelly connected to each of the first electrical load 132′, the second electrical load 132″, and the third electrical load 132′″. The output device 172 is configured to be activated to indicate an availability of the batteries 156 (of the lithium-ion battery pack 136) to supply electric power to the electrical load 132. For example, the light emitting diode 184 may be activated by being illuminated when the batteries 156 are available to supply a desired electric power to the engine starter motor 144, with said illumination being visible to an operator of the machine 100.

The circuit 180 may extend between the switching device 168 and the output device 172. For instance, the circuit 180 may include a first power supply line 182, a second power supply line 186, and a third power supply line 190. The first power supply line 182 may be configured to be connected to the switching device 168 (e.g., to at least one terminal of the switching device 168). The second power supply line 186 may be configured to be connected to the output device 172 (e.g., to at least one terminal of the output device 172). The third power supply line 190 may be configured to interconnect the first power supply line 182 and the second power supply line 186. In that manner, the first power supply line 182, the second power supply line 186, and the third power supply line 190 may be connected to each other to form and cause the circuit 180 to extend between the switching device 168 and the output device 172.

The circuit 180 may be configured to operate in a first mode and a second mode. The circuit 180 may operate in the first mode when the switching device 168 is at the second position (i.e., open position) (as shown in FIG. 2). In the first mode, the electric power may be restricted to flow between the switching device 168 and the output device 172 through the circuit 180. Further, the circuit 180 may operate in the second mode when the switching device 168 moves from the second position (i.e., open position) to the first position (i.e., closed position). In the second mode, the electric power is allowed to flow between the switching device 168 and the output device 172 through the circuit 180.

The controller 176 may be communicably coupled to the input device 128. The controller 176 may be configured to receive an input for an activation of the electrical load 132, from the input device 128. For example, the controller 176 may be operatively coupled to the starter switch 128′ of the machine 100 to receive an input (from the starter switch 128') associated with an activation of the engine starter motor 144, once the starter switch 128' is moved from the "OFF" position to the "ON" position. Also, the controller 176 may be communicably coupled to the batteries 156. In that manner, the controller 176 may be configured to monitor one or more parameters of the batteries 156. The parameters may include a voltage and a temperature associated with the at least one battery 156 of the one or more batteries 156.

Further, the controller 176 may be operatively coupled to the contactors 164 and the switching device 168. The controller 176 may be configured to actuate the contactor 164 (or contactors 164) to the closed position to facilitate electrical connection between the corresponding battery 156 (or batteries 156) and the electrical load 132, in response to the receipt of the input to activate the electrical load 132. The controller 176 may actuate the contactor 164 associated with the battery 156 based on the parameters associated with the battery 156 meeting the corresponding parameter threshold conditions. The parameter threshold conditions may be stored in a memory 188 of the controller 176 as a predefined data. For example, the controller 176 may monitor a voltage of the first battery 156' and actuate the first contactor 164' if the voltage of the first battery 156' lies within a corresponding voltage threshold range (stored in the memory 188). Additionally, the controller 176 may be configured to receive feedback signals, from the contactors 164, to detect the actuation of the contactors 164.

Furthermore, the controller 176 may be configured to move the switching device 168 to the first position (e.g., from the second position) to facilitate supply of electric power from the batteries 156 to the electrical load 132 and cause an activation of the output device 172, in response to the actuation of the contactors 164. In the present embodiment, as the switching device 168 moves to the first position, the activation of the output device 172 is caused by the supply of electric power from the at least one battery 156 to the output device 172 through the circuit 180.

Additionally, in some embodiments, the controller 176 may be configured to determine a minimum number of batteries 156 required to supply electric power to the electrical load 132, in response to the receipt of the input. For instance, the controller 176 may utilize a look-up table (pre-stored in the memory 188) to determine the minimum (or desired) number of batteries 156 required to supply the desired electric power to the electrical load 132. Once the minimum number of batteries 156 are determined, the controller 176 may be configured to monitor the parameters of each battery 156 and actuate the contactors 164 associated with the batteries 156 whose parameters meet their corresponding parameter threshold conditions.

The controller 176 may be housed within the lithium-ion battery pack 136, as shown in FIG. 2. In an example, the controller 176 may be associated with a battery management system of the lithium-ion battery pack 136. The controller 176 may include a processor 192 to process a variety of data (or input) such as the input received from the input device 128, the parameters corresponding to the batteries 156, and the like. Examples of the processor 192 may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Further, the controller 176 may include a transceiver 196. According to various embodiments of the present disclosure, the transceiver 196 may enable the controller 176 to communicate (e.g., wirelessly) with the input device 128, the batteries 156, the contactors 164, the switching device 168, etc., over one or more of wireless radio links, infrared communication links, short wavelength Ultra-high frequency radio waves, short-range high frequency waves, or the like. Example transceivers may include, but not limited to, wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

Examples of the memory 188 may include a hard disk drive (HDD), and a secure digital (SD) card. Further, the memory 188 may include non-volatile/volatile memory units such as a random-access memory (RAM)/a read only memory (ROM), which may include associated input and output buses. The memory 188 may be configured to store various other instruction sets for various other functions of the machine 100, along with the set of instruction, discussed above.

Figure 3:
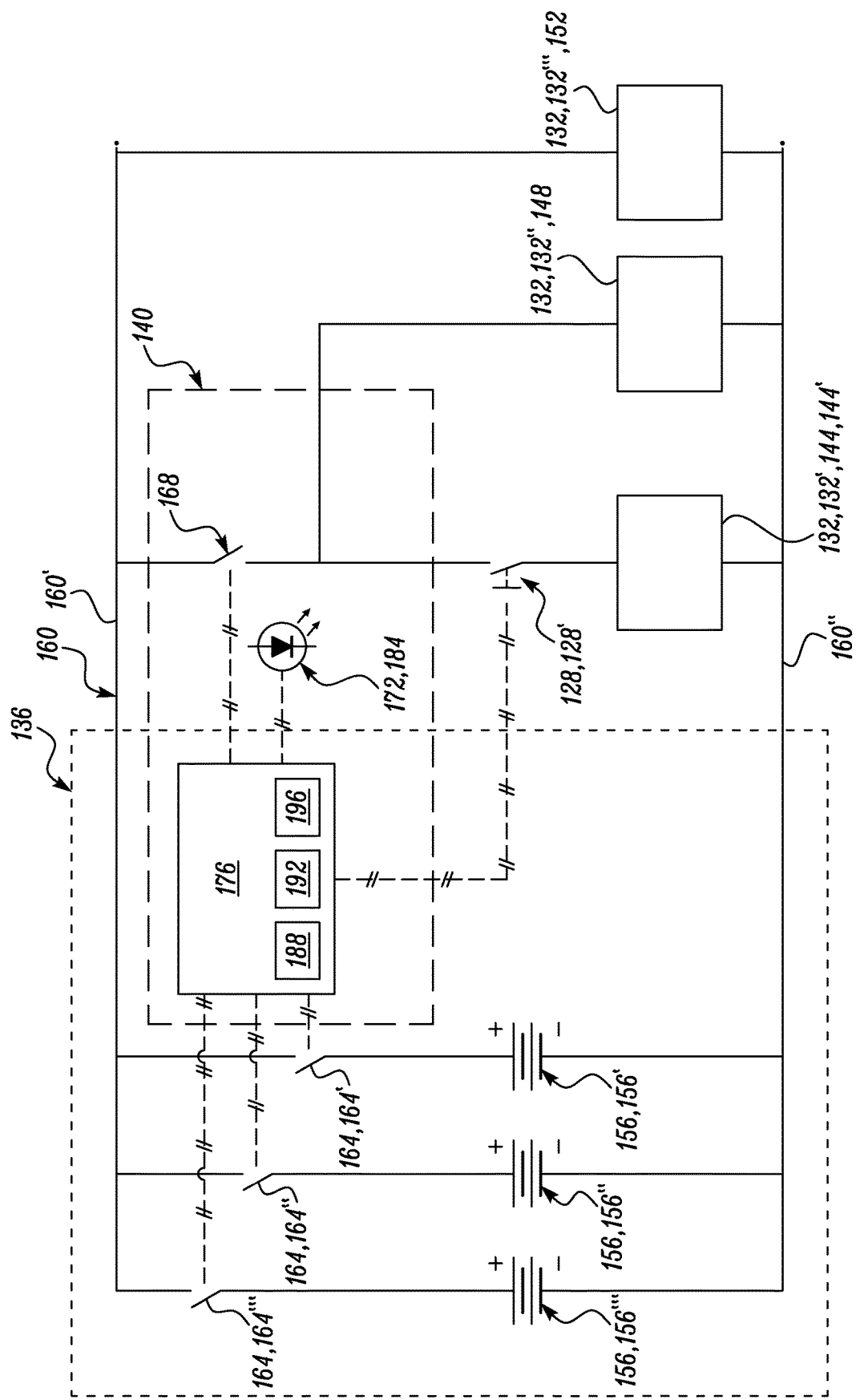
FIG. 3 is a schematic view of the system for initializing operations of the lithium-ion battery pack, in accordance with another embodiment of the present disclosure.

Referring to FIG. 3, a system 340 for initializing operations of the one or more batteries 156 of the lithium-ion battery pack 136 to supply electric power to the electrical load 132 of the machine 100 is shown. The system 340 is similar to the system 140 but differs from the system 140 in that the circuit 180 extending between the switching device 168 and the output device 172 is omitted. Rather, the controller 176 is operatively coupled (e.g., directly) to the output device 172 and the activation of the output device 172 is caused by an electric power (or an electric signal) supplied to the output device 172 by the controller 176. In other words, in response to the actuation of the contactors 164, the controller 176 may be configured to activate the output device 172 by supplying an electric power (or an electric signal) to the output device 172.

INDUSTRIAL APPLICABILITY

During an engine start-up event, when a request to activate a starter motor (such as the engine starter motor 144) is inputted (e.g., by an operator) to start an engine of a machine (such as the engine 124 of the machine 100), a lithium-ion battery pack (such as the lithium-ion battery pack 136) of the machine may require an amount of time to become available to supply electric power to the starter motor. If the operator of the machine attempts to start the engine prior to the availability of the lithium-ion battery pack, the lithium-ion battery pack may fail to supply the desired electric power to the starter motor. The disclosed system 140, 340, restricts the supply of electric power from the lithium-ion battery pack to the starter motor until the lithium-ion battery pack becomes available. Also, the disclosed system 140, 340, may indicate the availability status of the lithium-ion battery pack to the operator of the machine.

Figure 4:
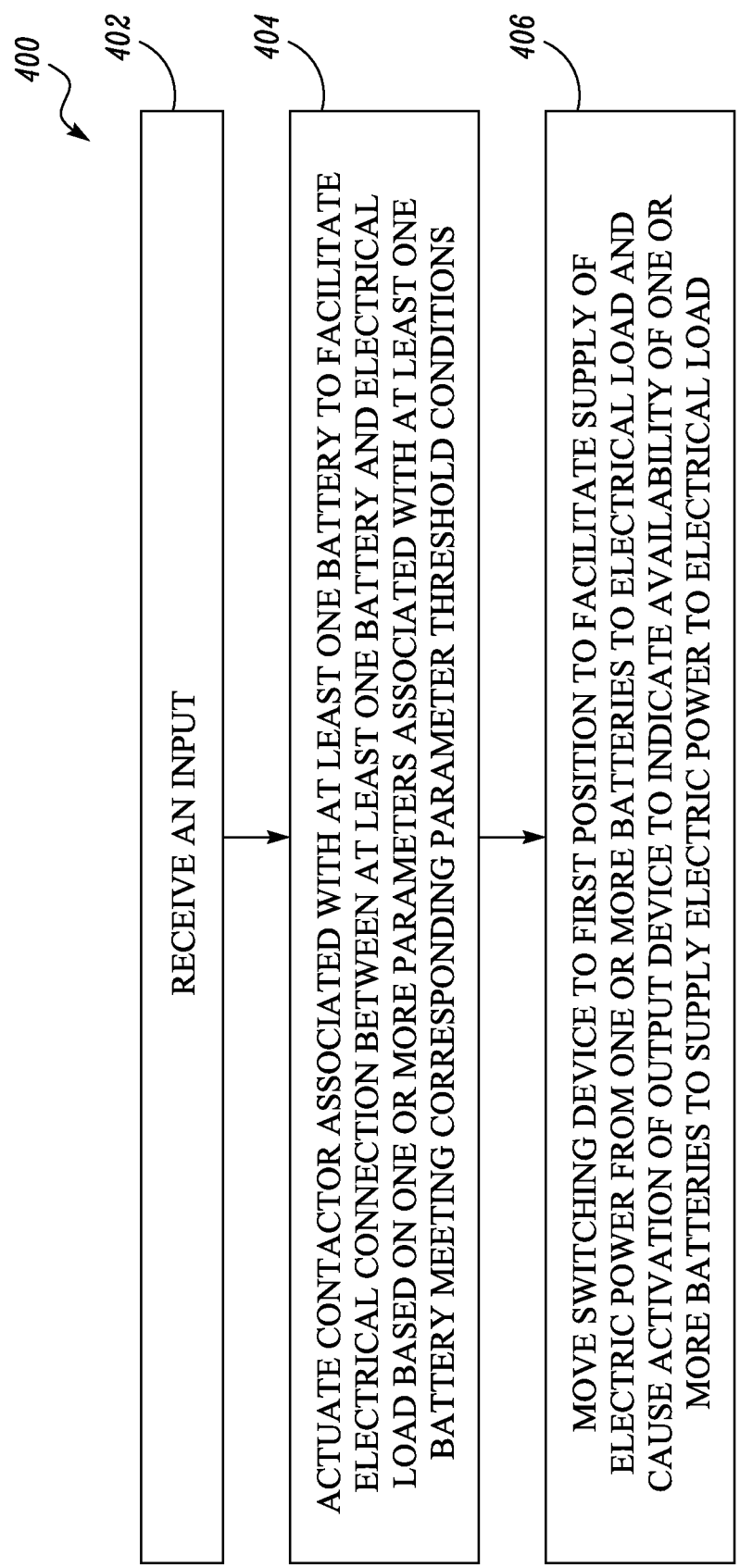
FIG. 4 depicts a flowchart illustrating a method for initializing operations of the lithium-ion battery pack, in accordance with an embodiment of the present disclosure.

Referring to FIG. 4, an exemplary method for initializing operations of the one or more batteries 156 of the lithium-ion battery pack 136 to supply electric power to the electrical load 132 of the machine 100 is set out. The method is discussed by way of a flowchart 400 and illustrates an exemplary process executable by the controller 176. The flowchart 400 is also discussed in conjunction with discussions that correspond to FIGS. 1 and 2.

The operator of the machine 100 may desire to start the engine 124 of the machine 100. In this regard, the operator may manipulate/actuate the starter switch 128' from the "OFF" position to the "ON" position to generate an input (e.g., an electrical signal) requesting an activation of the electrical load 132 (or the engine starter motor 144') and communicate the input to the controller 176. The controller 176 receives the input requesting the activation of the electrical load 132 from the input device 128 (or the starter switch 128') (step 402).

In response to the receipt of the input, the controller 176 actuates the contactor 164 associated with at the least one battery 156 to facilitate electrical connection between the at least one battery 156 and the electrical load 132 based on the parameters associated with the battery 156 meeting the corresponding parameter threshold conditions (step 404). In an example, the controller 176 may monitor the temperature of the first battery 156' and does not actuate the first contactor 164' if the temperature of the first battery 156' is outside a threshold temperature range. In another example, the controller 176 may monitor the voltage of the second battery 156" and actuate the second contactor 164" if the voltage of the second battery 156" lies within a voltage threshold range. Additionally, the controller 176 may receive feedback signals, from the contactors 164, to detect the actuation of the contactors 164.

Additionally, in some embodiments, in response to the receipt of the input requesting the activation of the electrical load 132, the controller 176 may determine the minimum (or desired) number of batteries 156 required to supply electric power to the electrical load 132. In an example, in response to the receipt of the input requesting the activation of the engine starter motor 144 of the machine 100, the controller 176 may determine (e.g., via look-up table pre-stored in the memory 188) that all the three batteries 156 (i.e., the first battery 156', the second battery 156", and the third battery 156''') are required to supply the desired electric power to activate the engine starter motor 144. Subsequently, the controller 176 may monitor (e.g., one-by-one) the voltages of all the three batteries 156, and accordingly, actuate their corresponding contactors 164 (i.e., the first contactor 164', the second contactor 164", and the third contactor 164''').

In another example, in response to the receipt of an input (e.g., through a separate input generation mechanism) requesting an activation of the HVAC unit 148 of the machine 100, the controller 176 may determine (e.g., via look-up table pre-stored in the memory 188) that two batteries 156 (e.g., the first battery 156' and the second battery 156") out of the three batteries 156 are required to supply the desired electric power to activate the HVAC unit 148. Subsequently, the controller 176 may monitor the voltages of the first battery 156' and the second battery 156", and accordingly, actuate their corresponding first contactor 164' and the second contactor 164".

Subsequent to the actuation of the contactors 164, the controller 176 moves the switching device 168 to the first position (e.g., from the second position) to facilitate supply of electric power from the batteries 156 to the electrical load 132 and cause the activation of the output device 172 to indicate the availability of the batteries 156 (or the lithium-ion battery pack 136) to supply electric power to the electrical load 132 (step 406). In an example, the controller 176 may move the switching device 168 to the first position to electrically connect the at least one battery 156 with the light emitting diode 184 (through the circuit 180) and cause the light emitting diode 184 to illuminate. Upon activation of the output device 172 (or the light emitting diode 184), the output device 172 may indicate the availability of the batteries 156 (or the lithium-ion battery pack 136) for supplying electric power to the electrical load 132. Once the light emitting diode 184 is illuminated, the operator may proceed to move the starter switch 128' to the "START" position to crank the engine 124 of the machine 100.

Further, an exemplary method for initializing operations of the one or more batteries 156 of the lithium-ion battery pack 136 by utilizing the system 340 of FIG. 3 may be contemplated. Said method may be similar in all respects to the method (discussed by way of the flowchart 400) for initializing operations of the one or more batteries 156 of the lithium-ion battery pack 136 by utilizing the system 140, of FIG. 2, but differs in that the controller 176 may activate the output device 172 by supplying the electric power (or an electric signal) directly to the output device 172 in response to the actuation of the contactors 164.

The disclosed system 140, 340 provides a reliable and cost-effective solution for managing (e.g., initializing) operations of one or more batteries of lithium-ion battery packs (such as the lithium-ion battery pack 136) to be retrofitted on existing machines (such as the machine 100). The disclosed system 140, 340 restricts the supply of electric power from the lithium-ion battery packs to larger electrical loads (such as the engine starter motor 144 of the machine 100) until the lithium-ion battery packs become available for electric power supply. Also, the disclosed system 140, 340 indicates availability status of the lithium-ion battery packs to one or more operators of the machines. In that manner, the disclosed system 140, 340 mitigates a risk of damage and/or deterioration of the lithium-ion battery packs.

It will be apparent to those skilled in the art that various modifications and variations can be made to the system and/or method of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A system for initializing operations of one or more batteries of a lithium-ion battery pack to supply electric power to an electrical load of a machine, the system comprising:
   a pair of power output terminals;
   a switching device configured to move between a first position and a second position, wherein in the first position, the switching device facilitates supply of electric power from the one or more batteries to the electrical load, and in the second position, the switching device restricts supply of electric power from the one or more batteries to the electrical load;
   an output device disposed between the pair of power output terminals and configured to be activated to indicate an availability of the one or more batteries to supply electric power to the electrical load;
   a circuit extending between the switching device and the output device, the circuit comprising:
      a first power supply line connected to the switching device;
      a second power supply line connected to the output device; and
      a third power supply line interconnecting the first power supply line and the second power supply line; and
   a controller configured to:
      receive an input;

actuate, in response to the input, a contactor associated with at least one battery of the one or more batteries to facilitate electrical connection between the at least one battery and the electrical load based on one or more parameters associated with the at least one battery meeting corresponding parameter threshold conditions, wherein the one or more parameters include a voltage and a temperature associated with the at least one battery; and move the switching device to the first position to cause an activation of the output device in response to the actuation of the contactor.

2. The system of claim 1, wherein the controller is configured to determine, in response to the receipt of the input, a minimum number of batteries of the one or more batteries required to supply electric power to the electrical load.

3. The system of claim 1, wherein the output device includes one or more of a light emitting diode, an audio output device, and a tactile feedback device.

4. The system of claim 1, wherein the activation of the output device is caused by the supply of electric power from the at least one battery to the output device through the circuit as the switching device moves to the first position.

5. The system of claim 1, wherein the activation of the output device is caused by an electric power supplied to the output device by the controller.

6. The system of claim 1, wherein the electrical load and the output device are electrically connected in parallel to each other.

* * * * *